Feb. 4, 1941.   A. A. PROPERNICK   2,230,728
WAFFLE IRON
Filed Sept. 1, 1938
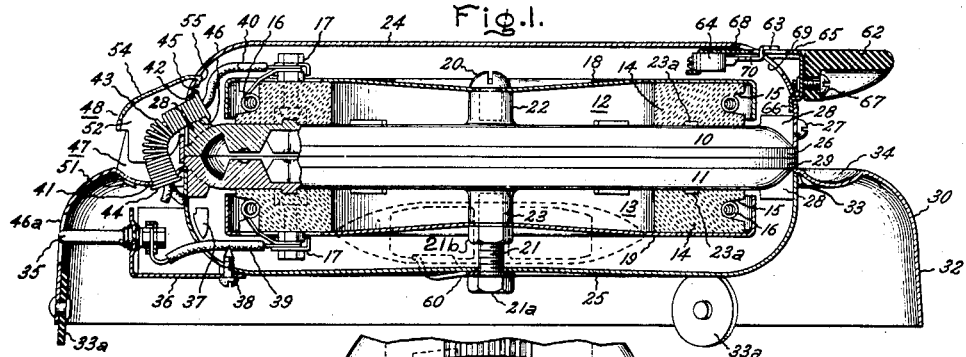
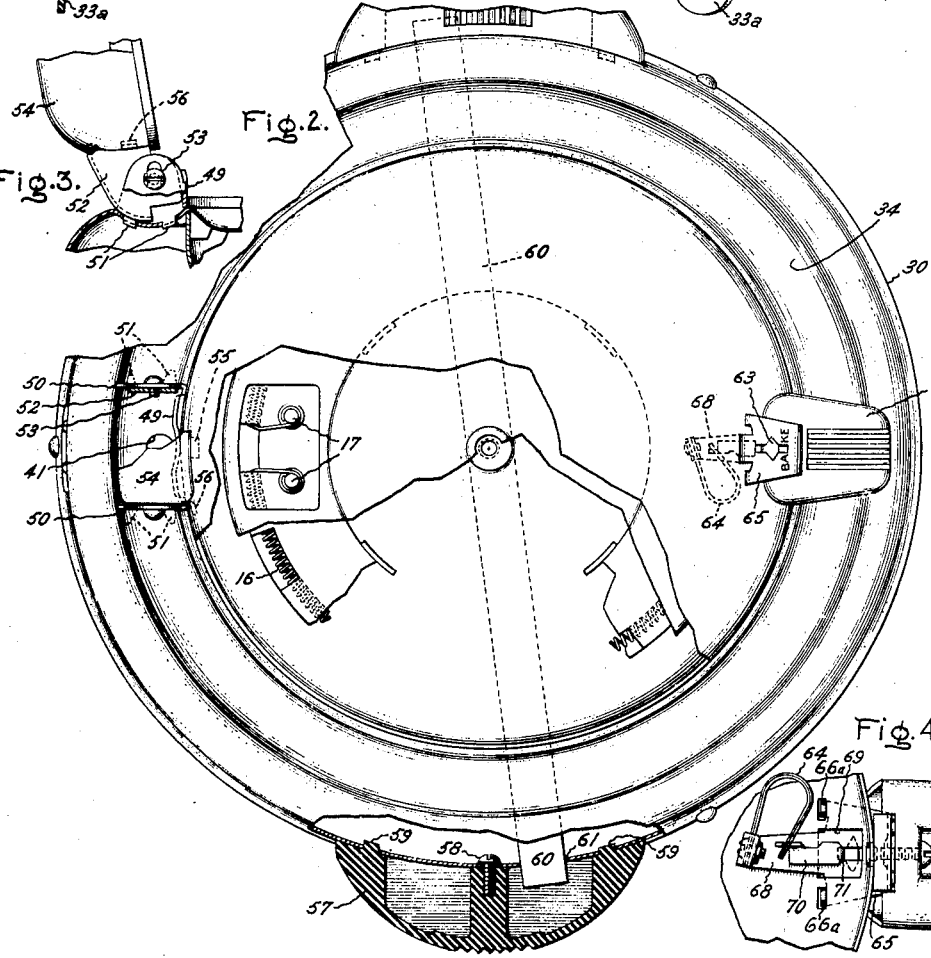
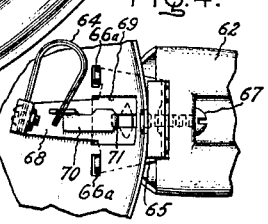
Inventor:
August A. Propernick,
by Harry E. Dunham
His Attorney.

Patented Feb. 4, 1941

2,230,728

UNITED STATES PATENT OFFICE 2,230,728

WAFFLE IRON

August A. Propernick, Bridgeport, Conn., assignor to General Electric Company, a corporation of New York Application September 1, 1938, Serial No. 227,923

8 Claims. (Cl. 219—19)

This invention relates to waffle irons, more particularly to electrically heated waffle irons, and it has for its object the provision of an improved device of this character.

More specifically, this invention contemplates an improved electrically heated waffle iron of simple and inexpensive construction involving among other features, improvements in the supporting base structure, in the means for supporting the heating elements in thermal relation with their grids, in the hinge structure uniting the two grids, and in the electrical connections between the grids.

For a more complete understanding of this invention, reference should be had to the accompanying drawing in which Fig. 1 is a side elevation, mainly in section of a waffle iron embodying this invention; Fig. 2 is a plan view of the waffle iron of Fig. 1 with parts broken away and shown in section so as to illustrate certain details of construction; Fig. 3 is a fragmentary elevation illustrating a hinge used to connect the upper and lower grids of the waffle iron, parts being broken away and shown in section so as to illustrate certain details of construction; and Fig. 4 is a bottom plan view of a portion of the waffle iron of Figs. 1 to 3.

Referring to the drawing, this invention has been shown in one form as applied to an electrically heated waffle iron comprising opposed upper and lower waffle grids 10 and 11. The grids 10 and 11 have substantially identically the same construction and may be formed of any suitable material such as cast aluminum or cast iron. These grids are heated by heating elements 12 and 13 of substantially identically the same construction. Each of these elements has a ring-shaped electrically insulating supporting member 14 which has in its outer edge a groove 15 in which is mounted a helical resistance conductor 16. Each end of the resistance conductor 16 is secured to a binding post 17.

The supporting rings 14 with the conductors 16 mounted in them are secured in direct thermal relation with the grids 10 and 11 by means of pressure plates 18 and 19. These pressure plates have substantially identically the same construction. As shown, they are of pan-like form and are arranged with their bottoms against the rings and their sides extending inwardly towards the grids to house the rings. The bottoms of the pressure plates are dished inwardly, as shown, and are secured to the grids by means of screw fastening members 20 and 21. These screw fastening members are threaded into bosses 22 and 23 provided on the upper and lower grids respectively. The upper screw device 20 has its head bearing on the upper surface of the pan 18, while the lower screw 21 has a nut 21b that holds the lower pan 19 in a similar way. The ring supports 14 are prevented from rotating by lugs 23a on the grids received in recesses provided for them in the support.

Suitable pan-shaped casings or housings 24 and 25 are provided for the upper and lower grids respectively housing the heating elements and pressure plates. As shown, these casings have substantially identically the same construction. The lower edge of the upper casing 24 bears against the upper surface of an outwardly extending flange 26 on the upper grid 10, and it is secured in this position by means of screws 27 at the front and rear of the casing directed through apertures in the casing and received in threaded engagement in bosses 28 provided at the front and rear of the upper grid, and preferably formed integrally with it.

The lower casing member 25 is similarly arranged, and its upper edge is directed towards an outwardly extending flange 29 provided on the lower grid 11. In this case, however, this edge does not bear directly against the flange 29, but the flange 29 does serve as an abutment for the casing. Moreover, the lower casing 25 is secured to its grid 11 in a somewhat different way than is the upper casing. The lower casing is secured to the lower grid by means of the screw 21 threaded into the boss 23. As shown, a nut 21a is threaded on the screw 21 outside of the casing 25 to secure it.

A base member 30 of inverted pan-like form is provided. As shown, this base has a downwardly extending relatively wide skirt 32 which extends downwardly sufficiently far to house the casing 25, and preferably will extend downwardly somewhat below the bottom wall of this casing, as shown. At its free upper edge, the base has an inwardly extending horizontal flange 33 which bears directly against the under surface of the flange 29 on the lower grid 11, and which is sandwiched between this flange and the upper edge of the lower casing 25. The base 30, therefore, is rigidly secured to the waffle iron assembly by the screw 21 through the medium of the lower casing 25. The skirt 32 has a plurality of spaced circular feet 33a secured at its lower edge.

The base is provided with a relatively wide shallow channel 34 between the skirt 32 and the flange section 33 that is received under the grid flange 29. This channel, it will be observed, surrounds the grids 10 and 11 and is positioned immediately below the meeting plane of these grids so that any batter overflowing the grids will fall directly into the channel. In other words, the channel 34 constitutes a drip trough.

This lower casing 25 also functions to support electrical supply terminals 35 for the waffle iron. As shown, these terminals are mounted on a bracket 36. This bracket is secured to the casing 25 by ears 37 on the bracket directed through slits provided for them in the casing, and by means of a screw 38 of the self-tapping type directed through the bracket and threaded in the casing. The ears 37 and the screw 38 detachably secure the bracket 36 to the lower casing.

The terminals 35 are electrically connected with the binding posts 17 of the lower heating element by means of leads 39 connected to the terminals and directed through apertures provided for them in the lower casing for connection with the binding posts 17. The upper binding posts 17 are electrically connected with the terminals by means of leads 40 which at their upper ends are connected with the binding posts, and at their lower ends with the terminals. These leads, as shown, extend upwardly from the base 30 through an aperture 41 provided in the rear of the channel 34 and thence are directed into the upper casing 24 through a slit 42 in its lower edge. That section of the conductors outside of the base and upper casing is provided with a coiled metallic armor 43. This armor at its lower end has a head 44 which prevents withdrawal of the armor from the aperture 41 and at its upper end is provided with a similar head 45 resting against the rear abutment 28 on the upper grid 10. The upper section of the armor is further secured by a serrated curved section 46 provided in the abutment and having its serrations receiving the coils of the armor in interlocking relation. This upper section of the armor is held in assembled relation with the serrated section by means of the upper casing member 24. The base 30 is provided in its skirt 32 with a supply plug opening 46a through which access can be had to the terminals.

The upper casing is hingedly secured to the base 32 by a hinge structure comprising a lower hinge section 47 and an upper hinge section 48. The lower hinge section has a base 49 at the opposite ends of which are two hinge lugs 50 arranged at substantially right angles to the base. The lugs 50 have at their lower ends tabs or ears 51 which are directed through slits provided for them in the bottom wall of the channel 34, and the lower ends of these tabs are peened or bent over, as shown, to secure the lower hinge member to the base. The upper hinge member comprises a pair of hinge lugs 52 which cooperate with the lugs 51 and which are secured to them by means of screws 53. These upper lugs are secured together by means of a housing member 54. This housing member, at its inner edge, has a tongue 55 directed through a slit provided for it in the upper casing 34 and turned or peened over, as shown in the drawing. Moreover, the lugs 52 are provided with ears 56 which are similarly directed through slits provided for them in the casing and peened over. The ears 55 and 56 secure the upper hinge member to the upper casing. It will be observed that the armor 43 of the conductors is directed upwardly through the space between the hinge lugs, and is covered by the housing 54.

The base is provided with a pair of handles 57 at its opposite sides. These handles are secured by single screw fastening means 58, and are prevented from turning about the screws by means of lugs 59 on the handles interlocked with the base by extending through apertures provided for them in the base, as clearly shown in Fig. 2.

The handles 57 are hollowed out on opposite sides of the screw as shown. This construction reduces the weight and expense of the handles, and in addition it functions to receive the ends of a reenforcing metallic strip 60 below the bottom casing 25. As shown, this strip extends transversely across the bottom of the casing and has its two ends directed through slits 61 provided in the skirt 32. These ends are received in the hollow sections of the handles, as shown.

A handle 62 is mounted on the upper casing. Associated with this handle is a suitable temperature indicator 63 to denote the proper baking heat; this indicator is operated by a suitable bimetallic thermostat 64.

A single support is provided for the handle, indicator, and thermostat. This support is as the form of an L-shaped bracket 65. An ear 66 is provided on the lower end of the vertical leg of the bracket and a pair of ears 66a on the end of the horizontal leg. These ears 66 and 66a are directed through slits in the casing 24 and are peened over to secure the bracket. The handle 62 is secured to the vertical leg by a screw 67. A tongue 68 extends back from the horizontal leg into the casing through an aperture 69 in the casing. The thermostat is of U-shape and has one leg rigidly secured to the tongue 68. Its other end is free to move and is connected to a slide 70 attached to the indicator 63. The slide, as shown, is directed up through a slot 71 in the bracket 65 to the indicator 63 located above the bracket. The slide is supported at its rear by the thermostat and at its front by the indicator overlying the slot 71 in the bracket 65.

It will be observed that I have provided a very simple and inexpensive waffle iron construction. The pressure plates have substantially the same size and shape and may be made on the same machine. Likewise, so are the casings 24 and 25 of the same size and shape so that they too may be made on the same machine. Furthermore, the waffle grids are duplicates of each other. The upper pressure plate and heating element are secured by a single screw 20; and the lower heating element and pressure plate, the base 30 and also the terminal structure are all secured by means of a single screw fastening device 21. The hinges are pressed steel parts and are secured by tabs, while the terminal bracket 34 is secured by tabs and a single screw. Moreover, a simple single bracket 65 holds the handle 62, the indicator 63, and its operating thermostat. This waffle iron is of extreme simplicity, is inexpensive to make, and yet is durable in construction, and efficient in operation.

While I have shown a particular embodiment of my invention it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electric waffle iron comprising upper and lower waffle grids, a heating element for the lower grid, a pressure plate holding said heating element in thermal relation with the grid, a base for the waffle iron having at its top an inturned flange bearing on the under-side of said lower grid, a casing within said base having its upper edge engaging said inturned flange on said base, a fastening device between said casing and grid securing them together and thereby securing the base to the grid, said casing constituting both a housing for said pressure plate and said heating element and also a cover plate at the lower part of said base, electrical supply terminals for said heating element enclosed by said base and mounted on said casing so as to be supported thereby, and said base having an opening through which a supply plug can be inserted for engagement with said terminals.

2. A waffle iron comprising upper and lower grids, heating elements for said grids, the grids having peripheral horizontal flanges extending outwardly therefrom, pan-like casings for the grids having their sides directed toward said flanges and the flanges constituting abutments for the edges of the casings, a base for said iron having a relatively wide depending skirt housing the lower casing and constituting a support for the iron, said base having at the top an inturned horizontal flange bearing against the horizontal flange on the lower grid, the upper edge of the lower casing engaging said horizontal flange on said base to secure the base between the lower grid flange and the casing, and said base having a peripheral drip trough formed therein interposed between its horizontal flange and said skirt.

3. A waffle iron comprising upper and lower grids, heating elements for said grids, the grids having peripheral flanges extending outwardly therefrom, pan-like casings for the grids having their sides directed toward said flanges and the flanges constituting abutments for the edges of the casings, a base for said iron having a relatively wide depending skirt housing the lower casing and constituting a support for the iron, said base having at the top an inturned flange bearing against the flange on the lower grid, the upper edge of the lower casing engaging said flange to secure the base between the lower grid flange and casing, the base having a drip trough between its flange and skirt, and means hinging said top casing to said base comprising a lower hinge member having lugs with depending tabs directed through apertures in the bottom wall of said trough and secured to said base, an upper hinge member secured to the upper casing, and means pivotally connecting said hinge members together.

4. A waffle iron comprising upper and lower grids, electrical heating elements for said grids, a casing for the upper grid, a base for the iron below the lower grid, supply conductors for the upper heating element extending from the base into said casing, a coiled metallic armor for said conductors between the base and casing and entering said casing, said upper grid having an open serrated section that receives the turns of said armor, and the upper casing holding said armor in position in said serrated section.

5. A waffle iron comprising upper and lower grids, an electric heating element for the lower grid, a pan-like casing housing said heating element, a base for the waffle iron having a flange interposed between the upper edge of the pan-like casing and the lower grid so as to be secured, and a reenforcing strip engaging the lower surface of the pan-like casing having its opposite ends directed through apertures provided for it in the base to hold said ends from moving downwardly, and a fastening device directed through apertures provided for it in said strip and casing and having its inner end secured to said grid.

6. A waffle iron comprising upper and lower grids, an electric heating element for the lower grid, a pan-like casing housing said heating element, a base for the waffle iron having a flange interposed between the upper edge of the pan-like casing and the lower grid so as to be secured, and a reenforcing strip engaging the lower surface of the pan-like casing having its opposite ends directed through apertures provided for it in the base to hold said ends from moving downwardly, a fastening device directed through apertures provided for it in said strip and casing and having its inner end secured to said grid, and handles secured to said base having hollowed out parts receiving the end portions of said reenforcing strip.

7. A waffle iron comprising upper and lower heating grids, a casing for the upper grid, a bracket secured to said casing, a handle attached to said bracket for moving said casing and grid between their open and closed positions, an indicating device mounted on said bracket so as to be supported solely by the bracket, and a thermostatic element also mounted on said bracket so as to be supported solely by the bracket and connected to said indicating device to operate it in accordance with the temperature of said thermostatic element.

8. A waffle iron comprising upper and lower grids, heating elements for said grids, a casing housing the upper heating element, a bracket having a plurality of lugs directed through apertures provided for it in said casing so as to secure the bracket to the casing, the bracket having a tongue extending backwardly through an aperture provided for it in the casing, a thermostat within the casing secured to said tongue so as to be supported solely by the bracket, an indicator mounted on the bracket so as to be supported solely thereby outside of said casing connected with said thermostat so as to be operated in accordance with the temperature in said casing, and a handle attached to said bracket.

AUGUST A. PROPERNICK.